(No Model.) 2 Sheets—Sheet 1.

G. G. CROWLEY.
BEET CULTIVATOR.

No. 498,241. Patented May 30, 1893.

Witnesses:
Emil Neuhart
Fred. C. Geyer

George G. Crowley Inventor.
By Wilhelm Bonner
Attorneys.

THE NORRIS PETERS CO., PHOTO-LITHO., WASHINGTON, D. C.

(No Model.) 2 Sheets—Sheet 2.
G. G. CROWLEY.
BEET CULTIVATOR.
No. 498,241. Patented May 30, 1893.
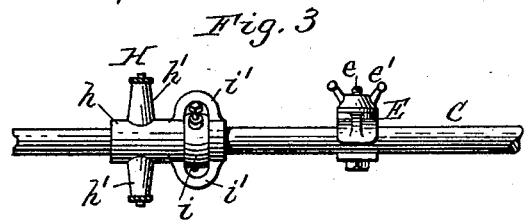
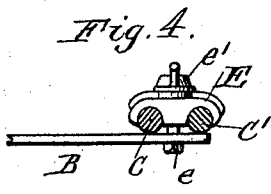
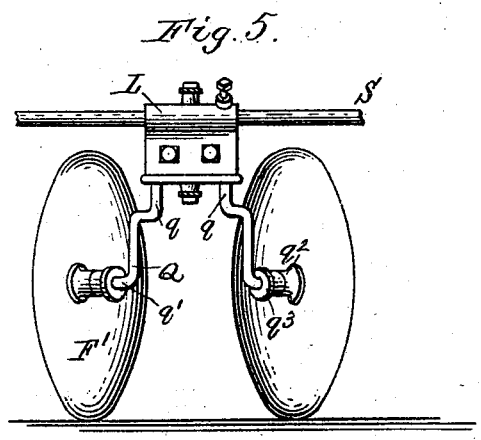
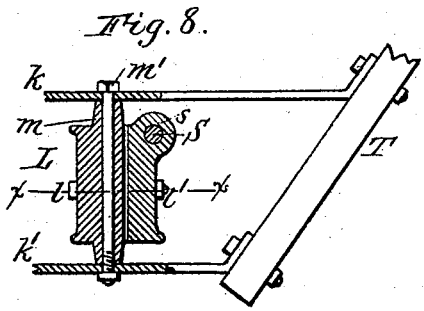
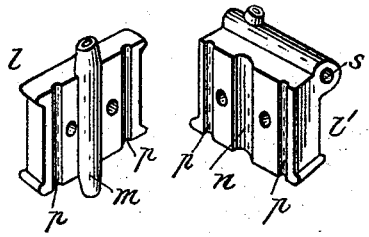
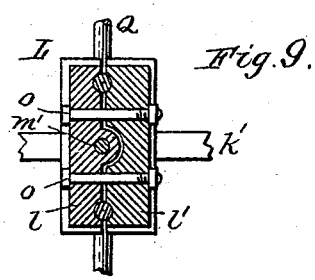
Witnesses:
Emil Neuhart
Fred C. Geyer
George G. Crowley Inventor.
By Wilhelm Bonner
Attorneys.
THE NORRIS PETERS CO., PHOTO-LITHO., WASHINGTON, D. C.

UNITED STATES PATENT OFFICE.

GEORGE G. CROWLEY, OF BATAVIA, NEW YORK, ASSIGNOR TO THE JOHNSTON HARVESTER COMPANY, OF SAME PLACE.

BEET-CULTIVATOR.

SPECIFICATION forming part of Letters Patent No. 498,241, dated May 30, 1893.

Application filed August 5, 1891. Serial No. 401,759. (No model.)

*To all whom it may concern:*

Be it known that I, GEORGE G. CROWLEY, a citizen of the United States, residing at Batavia, in the county of Genesee and State of New York, have invented new and useful Improvements in Beet-Cultivators, of which the following is a specification.

This invention relates to that class of cultivators which consist of a wheel frame to which the cultivating tools or devices are attached and which are principally employed for cultivating beets, potatoes and other small plants.

The objects of this invention are to provide the machine with simple and convenient devices whereby the wheels and the cultivating tools are adjusted, whereby the tools are held in position and whereby their movement is controlled.

Figure 1:
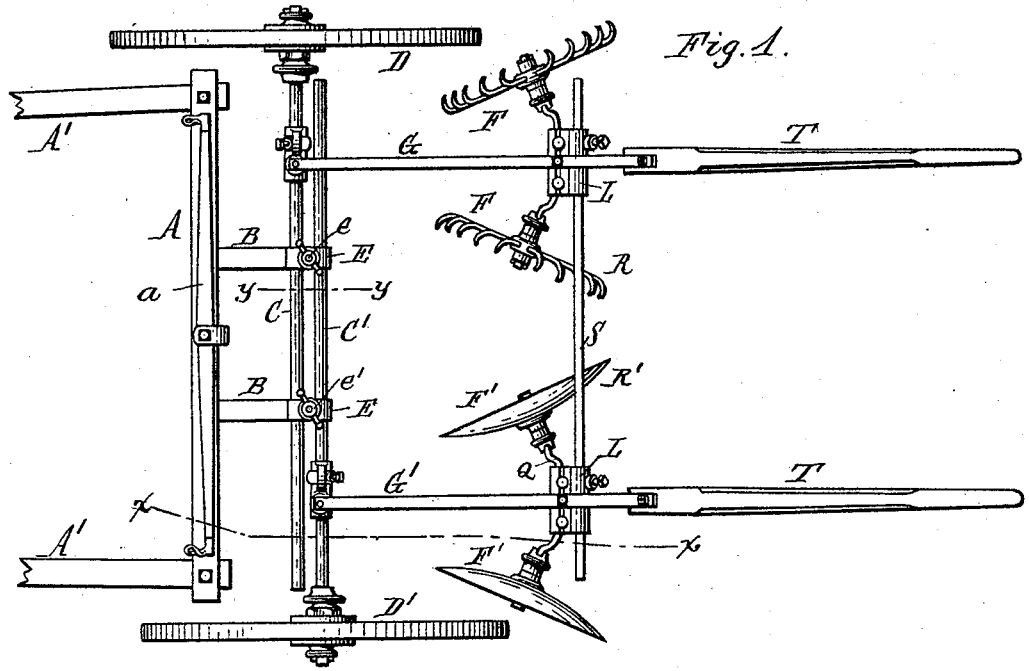
Figure 2:
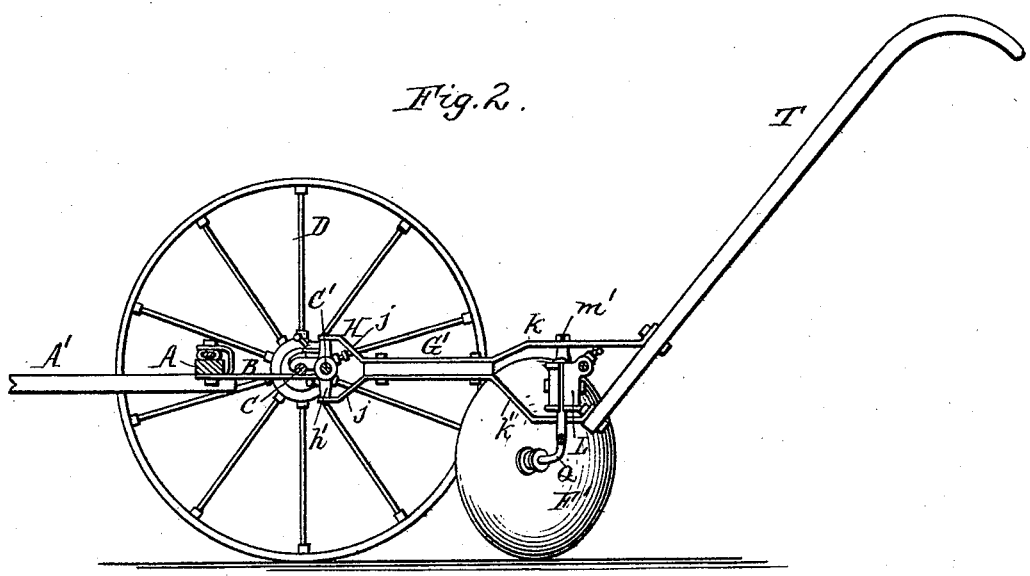

In the accompanying drawings consisting of two sheets:—Figure 1 is a top plan view of my improved cultivator. Fig. 2 is a longitudinal sectional elevation thereof, on line $x-x$, Fig. 1. Fig. 3 is a sectional rear elevation of a portion of the left hand shaft and connecting parts of the machine, on an enlarged scale. Fig. 4 is a longitudinal vertical section, on an enlarged scale, through both shafts, in line $y-y$, Fig. 1. Fig. 5 is a sectional rear elevation of a pair of the cultivating disks and supporting parts. Figs. 6 and 7 are perspective views of the two parts of the clamp in which the stems of the cultivating disks or tools are adjustably secured. Fig. 8 is a longitudinal section, on an enlarged scale, through one of the clamps to which the cultivating tools are attached. Fig. 9 is a horizontal section in line $x-x$, Fig. 8.

Like letters of reference refer to like parts in the several figures.

A represents the rear cross bar of the draft frame provided with forwardly extending thills A', a whiffletree $a$ and two rearwardly extending bars B on which the two shafts or axles C C' are supported. The two axles are arranged one behind the other and each carries one of the ground wheels D D', the wheel D being mounted on the foremost axle C and the wheel D' on the rearmost axle C', which latter is arranged at a short distance behind the axle C. Each axle extends across the machine nearly to the ground wheel mounted on the other axle. Both axles rest upon each of the bars B near the rear end thereof and are secured thereto by a clamping cap E which rests on both axles and is tightened against the same by a screw bolt $e$ passing upwardly through the bars B and the cap and by a thumb nut $e'$ which is applied to the upper end of the bolt and bears upon the cap. Upon loosening the nuts of both bolts, the axles can be shifted in the direction of their length on the supporting bars B, whereby the distance between the ground wheels can be increased or reduced as may be necessary to cause the wheels to properly run between the rows of plants.

F F and F' F' represent two pairs of cultivating tools which are arranged in rear of the axles and attached to the latter by longitudinal draft bars G G', the pair of tools F being attached to the axle C by the bar G and the pair F' to the axle C' by the bar G'. Each of these draft bars is attached to its axle by a cross head H which is mounted on the axle and consists of a sleeve $h$ and vertical arms $h'$ formed thereon. The sleeve $h$ is composed of two parts which are separated by an opening in which a collar $i$ is arranged and which are connected by arched bridge pieces $i'$ which extend over said collar. The latter is secured on the axle by a set screw so that its position can be shifted on the axle in the longitudinal direction of the latter, thereby shifting the position of the cross head likewise. The cross head is held against longitudinal movement on the axle by this collar, but is free to turn on the axle. The front end of each of the bars G G' is bifurcated vertically and its jaws $j$ engage with pins or trunnions formed on the arms $h'$ of the cross head on which the bar can swing horizontally while it can swing vertically by a turning movement of the cross head on the axle. The rear end of each of the bars G G' is also bifurcated vertically and its upper and lower jaws $k\ k'$ carry between them the clamp L to which the cultivating tools are secured. Each of these clamps consists of a front portion $l$ and a rear portion $l'$. The front portion $l$ is provided with an upright sleeve $m$ which fits with its ends between the jaws $k\ k'$ and is secured thereto by a bolt $m'$, which passes through the sleeve and these jaws. The rear portion $l'$ of the clamp is provided in its front face with a semi-cylindrical upright recess $n$ which fits over the rearwardly projecting semi-cylindrical portion of the sleeve $m$ and is secured to the front portion by bolts $o$. The rear face of the front portion $l$ and the front face of the rear portion $l'$ of the clamp form the contiguous faces of these parts and are each provided with two semi-cylindrical vertical recesses $p$ $p$ which are arranged on opposite sides of the center line of the clamp and in which the vertical upper portions $q$ of the stems Q are clamped to which the cultivating tools are attached. These tools may consist of toothed spiders R, as represented in the upper part of Fig. 1, or of disks R', as represented in the lower part of the same figure. In cultivating small plants, spiders are usually employed in the earlier stages of the cultivation and disks in the later stages. Each machine is preferably provided with a full equipment of these different tools.

The stems Q extend from the clamp first downwardly and then horizontally, so as to form at their lower ends cranks or elbows which carry the cultivating tools on their lower horizontal portions $q'$. The stems are preferably bent outwardly between their lower horizontal portions and their upper vertical portions to clear the row of plants. By turning the upright portion $q$ of the stem in its socket in the clamp, the angle of the disk or spider to the line of draft can be changed and the distance between the two members of the same pair can be increased or reduced. The tools can also be reversed so as to turn their concave sides inwardly or outwardly, as may be required. A removable sleeve $q^2$ is preferably interposed between each disk or spider and the collar $q^3$ on the lower part of the stem, so that by changing these sleeves for longer or shorter ones, or removing them altogether, the distance between the two tools of a pair can be regulated.

S represents a cross bar which extends through openings $s$ formed in the rear portions $l'$ of both clamps and which is secured therein by set screws. This cross bar holds the two clamps and the two pairs of cultivating tools at a certain distance apart and compels both pairs to move horizontally together in swinging on their cross heads. The cross bar also holds the two clamps parallel with the axles although the draft bars G G' may stand at an angle to the line of draft and the sleeves $m$ and bolts $m'$ of the clamps permit the clamps to pivot in the bifurcated rear ends of the draft bars as the latter swing horizontally.

T represents the handles which are secured with their lower portions to the rear ends of the jaws $k$ $k'$ of the draft bars G G' and extend upwardly and rearwardly therefrom. The operator walks behind the machine and controls the course of the cultivating tools by these handles. The tools are attached to the wheel frame by the herein described devices in such manner that they can be easily adjusted to the required work and that the operator can guide them with little effort.

I claim as my invention—

1. The combination with the draft frame, of axle supports secured to the draft frame and extending rearwardly therefrom, two axles each carrying a ground wheel and resting one behind the other upon the rear portions of said supports, caps resting upon both axles over each support, and bolts passing through the caps and supports and clamping the axles between them, substantially as set forth.

2. The combination with the draft frame, the axle, the draft bar and the cultivating tool attached thereto, of a cross head composed of two sleeves arranged side by side on said axle and connected by a bridge piece, a set collar arranged on the axle between the sleeves of the cross head, and supports on one of said sleeves to which the front end of the draw bar is pivoted, substantially as set forth.

3. The combination with the wheeled frame, of longitudinal draft bars pivoted at their front to the frame by vertical pivots, tool supports attached to the rear portions of the draft bars and provided with vertical sockets and horizontal openings, cultivator tools provided with upright stems which are secured in said vertical sockets, and a transverse bar which is secured in the horizontal openings of both tool supports, substantially as set forth.

4. The combination with the draft bar having a bifurcated rear end, of a clamp composed of a front and rear portion, one of said portions being provided with a sleeve fitted between the ends of the draft bar and with a bolt passing through said sleeve and the ends of the draft bar, substantially as set forth.

5. The combination with the draft bar having a bifurcated rear end, of a clamp composed of a front and rear portion, one of said portions being provided with a sleeve fitted between the ends of the draft bar and with a bolt passing through said sleeve, and both parts of the clamp being provided in their contiguous faces, on both sides of said sleeve, with recesses in which the tool holding stems are seated, substantially as set forth.

Witness my hand this 1st day of August, 1891.

GEORGE G. CROWLEY.

Witnesses:
ALBERT J. GLASS,
E. J. MOCKFORD.